(12) United States Patent
Saito et al.

(10) Patent No.: US 8,929,190 B2
(45) Date of Patent: Jan. 6, 2015

(54) OPTICAL INFORMATION RECORDING MEDIUM AND OPTICAL INFORMATION RECORDING MEDIUM REPRODUCING APPARATUS

(71) Applicant: Sony Corporation, Tokyo (JP)

(72) Inventors: Kimihiro Saito, Kanagawa (JP); Toshihiro Horigome, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 13/898,511

(22) Filed: May 21, 2013

(65) Prior Publication Data

US 2013/0322228 A1 Dec. 5, 2013

(30) Foreign Application Priority Data

May 30, 2012 (JP) ................................ 2012-123215

(51) Int. Cl.
*G11B 7/24* (2013.01)
*G11B 7/007* (2006.01)
*G11B 7/24082* (2013.01)
*G11B 27/24* (2006.01)

(52) U.S. Cl.
CPC ........ *G11B 7/00718* (2013.01); *G11B 7/24082* (2013.01); *G11B 27/24* (2013.01); *G11B 2007/00754* (2013.01)
USPC ..................................................... 369/275.4

(58) Field of Classification Search
CPC ............. G11B 7/00745; G11B 7/0045; G11B 7/00718; G11B 7/007; G11B 7/005; G11B 2007/00754; G11B 7/24082; G11B 27/24; G11B 7/24038; G11B 7/00736
USPC ............... 369/275.1–275.5, 283, 44.13, 47.1, 369/47.27, 44.26
See application file for complete search history.

(56) References Cited

U.S. PATENT DOCUMENTS

| | | | | |
|---|---|---|---|---|
| 6,671,238 B1 * | 12/2003 | Ko et al. | ....................... | 369/47.1 |
| 6,744,718 B1 * | 6/2004 | Ko et al. | ..................... | 369/59.25 |
| 6,813,230 B1 * | 11/2004 | Ko et al. | ....................... | 369/47.1 |
| 7,092,329 B2 * | 8/2006 | Ko et al. | .................... | 369/47.27 |
| 7,224,651 B2 * | 5/2007 | Ko et al. | .................... | 369/47.27 |

FOREIGN PATENT DOCUMENTS

| | | |
|---|---|---|
| JP | HEI09-219024 | 8/1997 |
| JP | 2003-178464 | 6/2003 |
| JP | 2006-228293 | 8/2006 |

* cited by examiner

*Primary Examiner* — Ali Neyzari
(74) *Attorney, Agent, or Firm* — Wolf, Greenfield & Sacks, P.C.

(57) ABSTRACT

An optical information recording medium of a CAV or a zone CAV, in which a groove wobbling continuously is formed in advance so as to record information to a groove and a land abutting the groove, the groove alternately has a first wobble position in which a wobble fundamental wave form has been modulated by groove address information, and a second wobble position of the wobble fundamental wave form, and in grooves of both sides by which the land is interposed, the first wobble position and the second wobble position are different from each other in position.

6 Claims, 9 Drawing Sheets

FIG. 3

| ADIP UNIT NUMBER | ADIP UNIT TYPE | ADIP NIBBLE BIT NUMBER | ADIP CODE WORD NIBBLE NUMBER |
|---|---|---|---|
| 0 | MONOTONE | - - - | - - - |
| 1 | sync_0 | - - - | |
| 2 | MONOTONE | - - - | |
| 3 | sync_1 | - - - | |
| 4 | MONOTONE | - - - | |
| 5 | sync_2 | - - - | |
| 6 | MONOTONE | - - - | |
| 7 | sync_3 | - - - | |
| 8 | REFERENCE | - - - | |
| 9 | data_x | b3 | C0 |
| 10 | data_x | b2 | |
| 11 | data_x | b1 | |
| 12 | data_x | b0 | |
| 13 | REFERENCE | | - - - |
| 14 | data_x | b3 | C1 |
| 15 | data_x | b2 | |
| 16 | data_x | b1 | |
| 17 | data_x | b0 | |
| 18 | REFERENCE | | |
| 78 | REFERENCE | | - - - |
| 79 | data_x | b3 | C14 |
| 80 | data_x | b2 | |
| 81 | data_x | b1 | |
| 82 | data_x | b0 | |

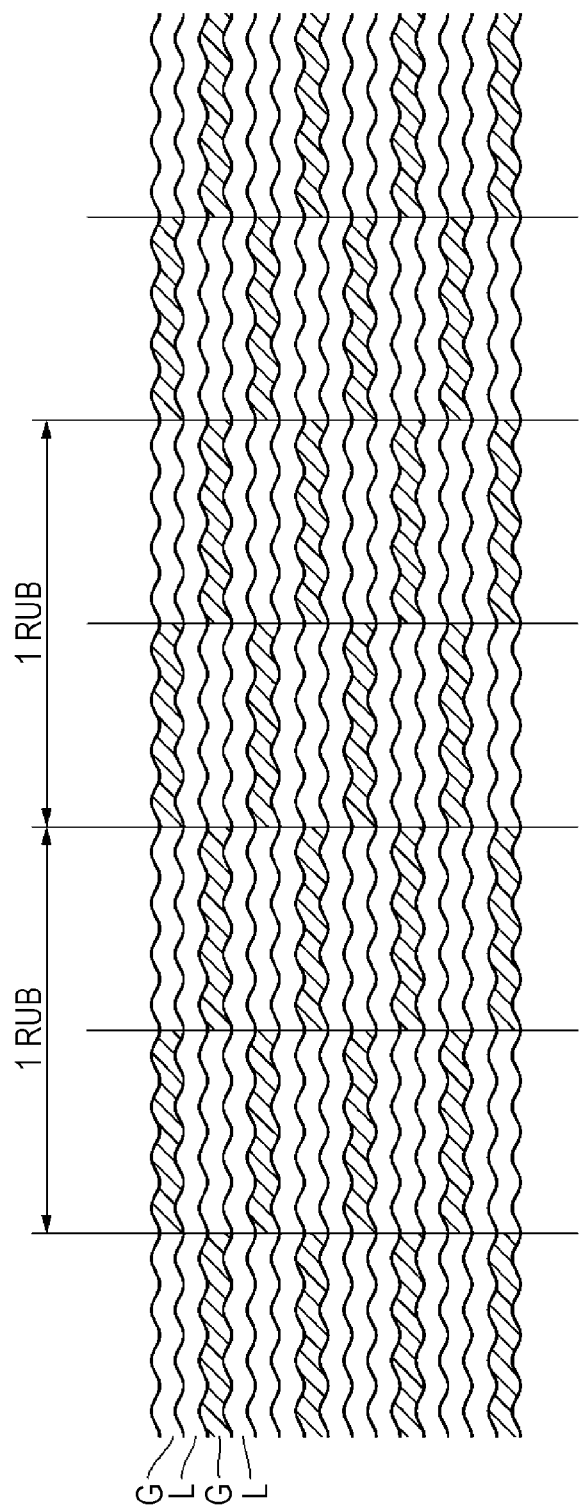

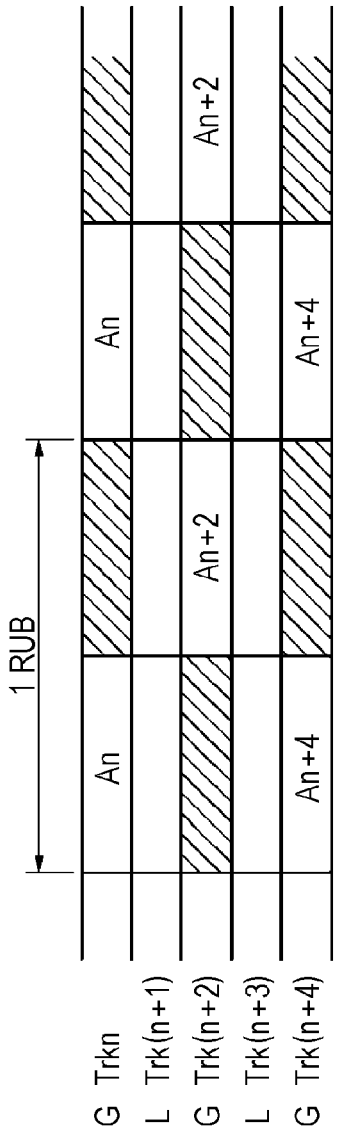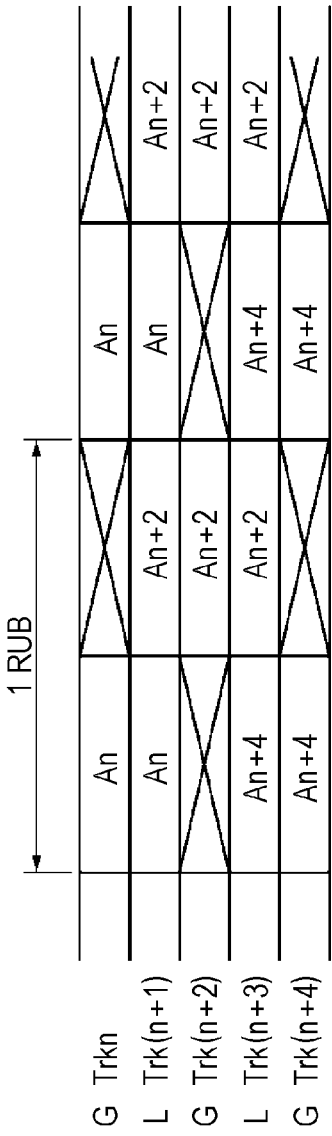

OPTICAL INFORMATION RECORDING MEDIUM AND OPTICAL INFORMATION RECORDING MEDIUM REPRODUCING APPARATUS

BACKGROUND

The present disclosure, for example, relates to an optical information recording medium, and an optical information recording medium reproducing apparatus which are capable of being applied to a recordable optical disc.

In the past, an optical disc which records information or reproduces recording information by using a laser beam was applied practically. As for a kind of optical disc, there are a read only type, write once type, and rewriting type. In the write once type and the rewriting type, it is necessary that address information which indicates a position of the optical disc in advance is recorded for recording the information.

As for the method of recording address information, there are two kinds. One of them is a method that records the address information with a preformatted pit. Other method is a method that modulates a signal which forms a ditch referred to as a wobble to the ditch by the address information. Recording the preformatted pit has a problem that an area for recording user data is reduced, and a recording capacity is reduced. A wobble method has an advantage that such a problem does not occur. Further, the ditch is referred to as a groove, and a track formed by the groove is referred to as a groove track. The groove, in a time of manufacturing the optical disc, is defined as a position which is irradiated by the laser beam, an area which is interposed between abutting grooves is referred to as a land, and a track which is formed by the land is referred to as a land track.

In the case of recording the address by the wobble, for further increasing the recording capacity, it is desirable to use the method of recording data to both sides of the groove track and the land track (appropriately referred to as a land-groove recording method). In the land-groove recording method, it is possible to record the address information corresponding to the groove track by causing the laser beam to be biased in a time of cutting. However, it is difficult to record the address corresponding to the land track by the wobble. In a case of scanning the land track, the wobble of groove tracks of the both sides is reproduced. However, the wobble is information of different groove track, and, in a state that the wobble is not in phase, it is difficult to reproduce the wobble.

From the past, in the land-groove recording method, an optical disc which enables to reproduce the address of the both sides of the groove track and the land track has been suggested. Japanese Unexamined Patent Application Publication No. 9-219024 discloses is to intermittently that the address is recorded the address in a case of recording the address to the groove track by the wobble, and further, to reverse the phase of recording position of the address between the groove track and an abutting groove track. Thus, in a time of reproducing the wobble track, the address information which was recorded originally is intermittently reproduced, and, when the land track is reproduced, the address of abutting groove tracks of both sides becomes to be reproduced alternately. As a result, in any one of the time of scanning the groove and the time of scanning the land, it is possible to obtain wobble information (address information).

Japanese Unexamined Patent Application Publication No. 2003-178464 and Japanese Unexamined Patent Application Publication No. 2006-228293 disclose that each of the land track and the groove track is made wobble, and the address information is recorded on a side wall of one side of each track by the wobble. Further, an address information block of the wobble track and an address information block of the groove track are shifted and arranged in the direction of the track.

SUMMARY

In Japanese Unexamined Patent Application Publication No. 9-219024, an address of the land track is obtained by reproducing the address corresponding to the groove track of one of inside of two abutting groove tracks. Thus, there is a high concern where it becomes to be not possible to read the groove address due to an off-track. Further, in Japanese Unexamined Patent Application Publication No. 9-219024, the wobble is intermittently present in the wobble track. The wobble is a signal which becomes a basis for generating a clock corresponding to the position on the optical disc. The clock is a signal necessary for the both sides of recording and reproducing. Thus, as disclosed in Japanese Unexamined Patent Application Publication No. 9-219024, in the groove track, an interval where the wobble is not present is present intermittently, and, accordingly, it is disadvantageous in a side of generating a precise clock.

Japanese Unexamined Patent Application Publication No. 2003-178464 and Japanese Unexamined Patent Application Publication No. 2006-228293 disclose that, since an interruption of the wobble does not occur, there is no problem in a side of generating the clock. However, it is necessary to make a ditch wall of one side wobbled in order to record supplementary information separately from a wobble of a fundamental frequency. It is difficult to form such wobble by a single laser beam in a time of cutting, and also there is a problem that a cutting apparatus becomes complicated.

It is desirable to provide an optical information recording medium and an optical information recording medium reproducing apparatus without interruption of wobble in a groove track and capable of cutting by a single beam.

According to an embodiment of the present disclosure, there is provided an optical information recording medium of a CAV or a zone CAV in which a groove wobbling continuously is formed in advance so as to record information to the groove and the land abutting the groove, and the groove alternately includes a first wobble position in which a wobble fundamental wave form has been modulated by groove address information, and a second wobble position of the wobble fundamental wave form, and in grooves of the both sides by which the land is interposed, the first wobble position and the second wobble position are different from each other in position.

According to an embodiment of the present disclosure, there is provided an optical information recording medium reproducing apparatus that optically reproduces an optical information recording medium of a CAV or a zone CAV in which a groove wobbling continuously is formed in advance so as to record information to the groove and a land abutting the groove, and in which the groove alternately includes a first wobble position in which a wobble fundamental wave form has been modulated by a groove address information, and a second wobble position of the wobble fundamental wave form, and in which in the grooves of the both sides by which the land is interposed, the first wobble position and the second wobble position are different from each other in position, and forms the address information of the land by sequentially reproducing the groove address information of the first wobble position in the grooves of the both sides.

According to the embodiments of the disclosure, in a case of performing recording to the both sides of the groove and the land, it is possible to record the address of the land only by a modulation of the groove. In a time of scanning the land, the address information of the land is prescribed according to two items of groove address information sequentially reproduced from the grooves of the both sides.

BRIEF DESCRIPTION OF THE DRAWINGS

FIG. 3 is a schematic diagram illustrating a data structure of an ADIP word of a BD format;

FIG. 7 is a schematic diagram schematically illustrating a pattern of a groove and a land used in describing an embodiment of the present disclosure;

FIGS. 8A and 8B are schematic diagrams used to illustrate an address reproduction in describing an embodiment of the present disclosure.

DETAILED DESCRIPTION OF EMBODIMENTS

Embodiments described hereinafter are appropriate and particular examples of the present disclosure, and technically preferable various limitations are imposed. However, a scope of the present disclosure is not limited to such embodiments insofar as there is no description which has intent of limiting the present disclosure particularly.

Hereinafter, a description will be given as follows:
1. BD Format
2. Embodiment
3. Modified Example 1. BD Format In the present disclosure, a format of the address information and the like follow a BD (Blu-ray Disc (registered trademark)) format. According to this, it is possible to use a greater part of a technology of the BD which is a high-density optical disc as well as being applied practically. Thus, before entering into a description of the present disclosure, a description will be given regarding the address information in the BD format.

Figure 1:
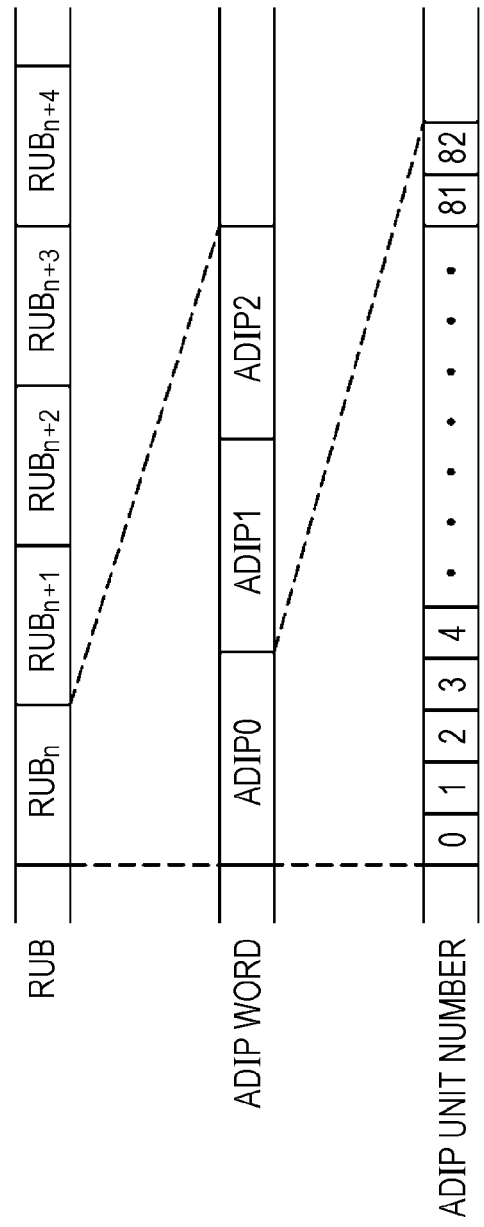
FIG. 1 is a schematic diagram illustrating address data of a BD format.

As shown in FIG. 1, main data to be written in is a series of RUB (Recording Unit Block) ($RUB_{n+0}$, $RUB_{n+1}$, $RUB_{n+2}$, $RUB_{n+3}$, ...). RUB is a unit to record the main data (recording reproducing data), and a predetermined length, for example, is set to 64 kbytes. 3 ADIP (Address In Pregroove) words, ADIP0, ADIP1, and ADIP2 are allotted to every 1 RUB. ADIP0, ADIP1, and ADIP2 have the same address information mutually.

Further, 83 (unit numbers, 0 to 82) ADIP units are contained in one ADIP word. 24 bits of the address information, 12 bits of the auxiliary data, a reference area, and an error correction code, and the like are stored in one ADIP word. Such information is expressed by using, for example, 60 ADIP units among 83 ADIP units.

Figure 2:
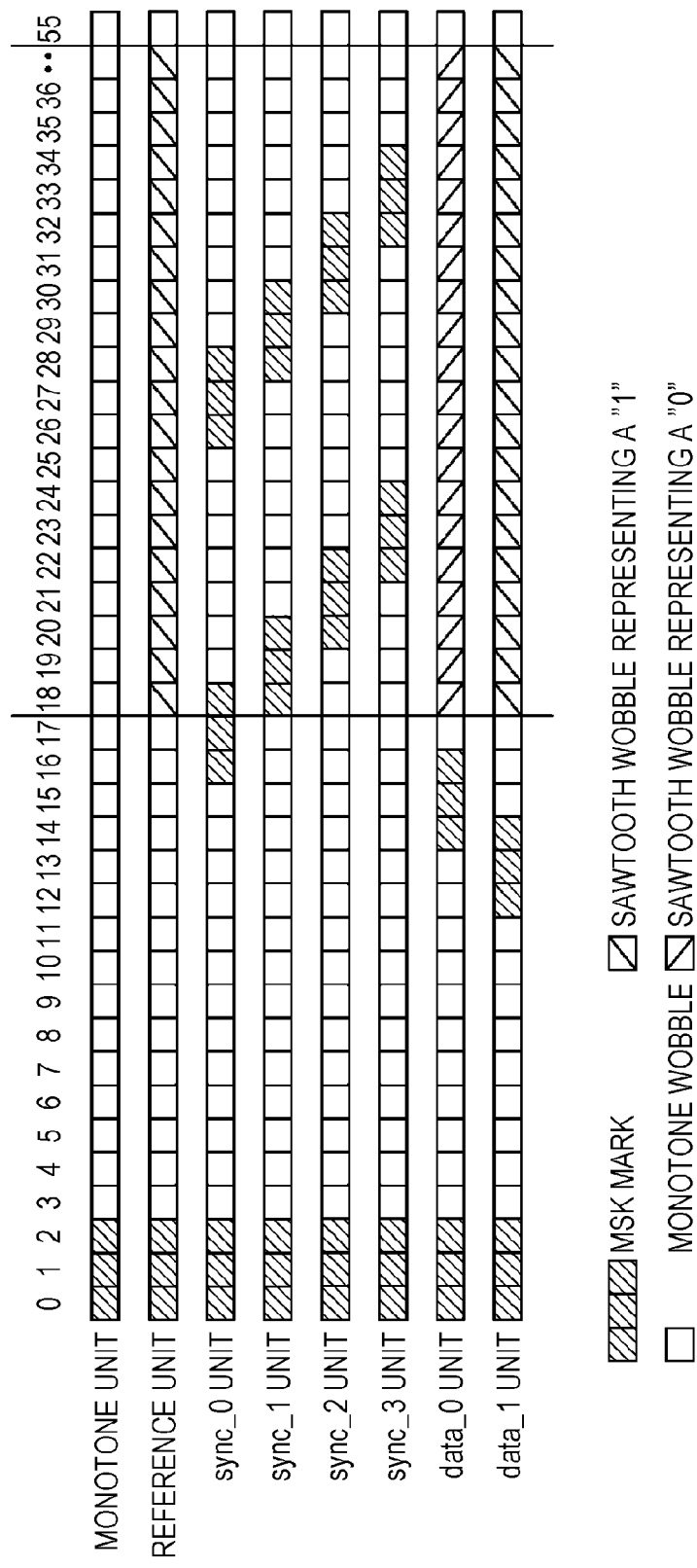
FIG. 2 is a schematic diagram illustrating an ADIP unit of a BD format.

As shown in FIG. 2, a group of 56 wobbles in total is referred to as an ADIP unit, and one bit of "0" or "1", synchronization information, a reference unit, or a monotone unit is expressed by using the ADIP unit. 1 wobble is, for example, one cycle of a fundamental wobble wave form ($\cos(2\pi ft)$). Thus, 1 ADIP word is formed by (83×56) wobbles. In FIG. 2, 8 kinds (monotone unit, reference unit, 4 kinds of synchronization units, and 2 kinds of data units which respectively express "0" or "1" of the data) of the ADIP units are illustrated. Further, in FIG. 2, a group of 35 wobbles is illustrated due to a spatial limitation.

As shown in FIG. 2, when wobble numbers, 0 to 55 are assigned to the ADIP unit formed by 56 wobbles for a distinction, for example, an interval and the like in which the wobble numbers are assigned from 0 to 2 are modulated to a MSK (Minimum Shift Keying), and the wobble numbers of the reference unit and the data unit from 18 to 54 are modulated to a STW (Saw Tooth Wobble). The monotone wobble not modulated is wobbled to a fundamental wave of the predetermined frequency ($\cos(2\pi ft)$).

The ADIP word has a data structure as shown in FIG. 3. An ADIP unit type in FIG. 3 corresponds to a kind of the ADIP unit in FIG. 2. 60 bits of data is contained in one ADIP word.

Figure 4:
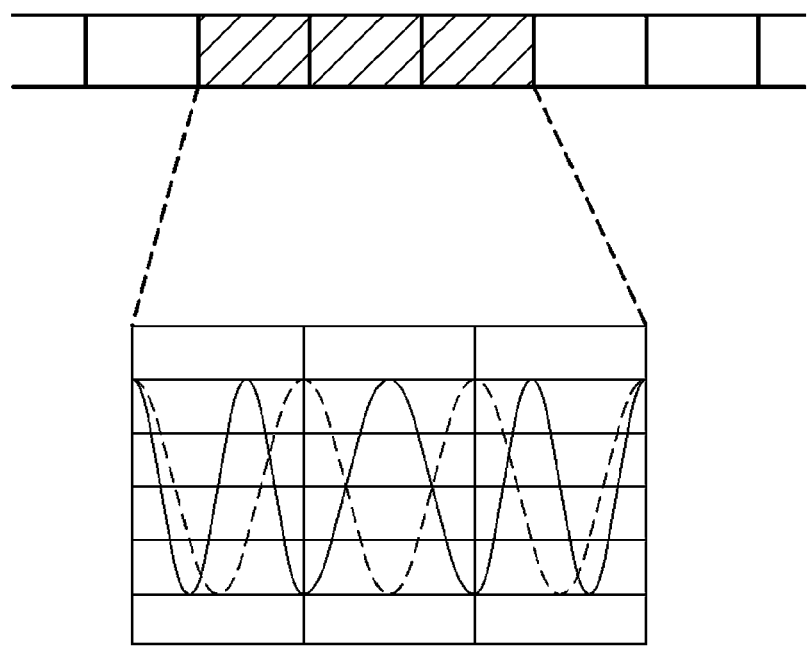
FIG. 4 is a wave form diagram illustrating an MSK.

As shown in FIG. 4, the MSK is configured by 3 wobbles. Since a frequency of a preceding wobble and a following wobble is 1.5 times a fundamental wave, the wave form of a central wobble is polarity reversed at a position which is not the MSK. The MSK is arranged at a head portion (0 to second wobbles) of each ADIP unit, and used to detect a head portion of the ADIP unit.

Further, as shown in FIG. 2, the MSK is arranged from the head portion of the ADIP unit of data 0 to positions of the 14th to 16th wobbles, and the MSK is arranged from the head portion of the ADIP unit of data 1 to positions of the 12th to 14th wobbles. Thus, 0 and 1 of the data are expressed by positions of the MSK.

In the ADIP unit of the data 0, while the MSK is set to 0, a STW which expresses 0 at an interval of the 18th to 55th wobbles from the head portion is arranged. In the ADIP unit of data 1, while the MSK is set to 1, the STW which expresses 1 at an interval of the 18th to 55th wobbles from the head portion is arranged.

A STW method is to generate a modulated wave form similar to a saw tooth by adding or subtracting a secondary higher harmonic wave ($\sin(2\pi 2ft)$) to the fundamental wave ($\cos(2\pi ft)$). Amplitude of the secondary higher harmonic wave is set to a small size of ¼ of the fundamental wave form. Since any one of addition and subtraction is selected by "0" or "1" of the data, the modulated wave form becomes to be changed. A saw tooth wobble is repeated and recorded at the interval where the wobble numbers of the reference unit and the data unit are 18 to 54.

Thus, the reason to use two kinds of methods is to supplement a disadvantage of each method. In the MSK method, since 1 bit is recorded by modulating 3 wobbles of the head portion of the ADIP unit, it is possible to use the MSK as a basis to decide the position of the data in a time of reproduction. On the other hand, the STW method is repeated and recorded across a wide range as a small wave form change, and in a time of reproduction, the STW method determines "0" or "1" by integrating a reproduced signal. Thus, it is difficult to use a reproduced signal as information for detecting an end of the data. However, the MSK method that is a local recording method is likely to be affected by a defect resulting from a dust and the like. There is an advantage that the STW method is not likely to be affected by such a defect since the STW method is recorded over a longer period.

Figure 5A:
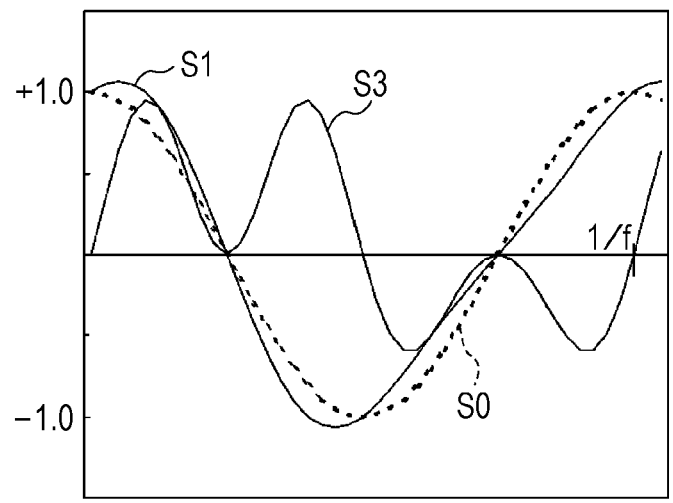
FIGS. 5A and 5B are wave form diagrams illustrating an STW.

A more specific description will be given regarding a modulated wobble signal of the STW method referring to FIGS. 5A to 6B. In FIGS. 5A to 6B, a horizontal axis refers to a time axis, one cycle (that is, one wobble) of the fundamental wobble wave form is illustrated, and a vertical axis refers to normalized amplitude. FIG. 5A illustrates the wave form in a case where data c(n) is "1", and FIG. 6A illustrates the wave form in a case where the data c(n) is "0."

Figure 6A:
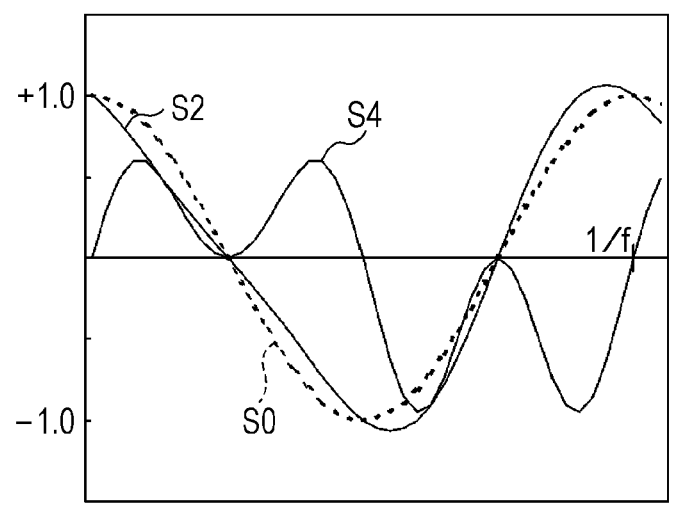
FIGS. 6A and 6B are wave form diagrams illustrating an STW.

In FIGS. 5A and 6A, the wave form drawn in a broken line is a fundamental wobble wave form S0 (=cos(2πft)). In a case where c(n)=1, formed is a wave form S1 which is modulated by adding a sin signal that has the frequency 2 times as great as the fundamental wobble wave form S0. That is, S1=A cos(2πft)+a sin(2π2ft). A relationship of A>a is established, and for example, A=1, and a=0.2. This modulated wobble wave form S1 is a wave form to be modulated so that, when seen in a direction of time, a rise (which is an outer side direction of a disk when seen in a radial direction of the disk) is gradual compared to the fundamental wobble wave form S0, and a decline (which is an inner side direction of a disk when seen in the radial direction of the disk) is steep compared to the fundamental wobble wave form S0.

As shown in FIG. 6A, in a case where c(n)="0", formed is a wave form S2 which is modulated by subtracting the sin signal that has the frequency 2 times as great as the fundamental wobble wave form S0. That is, S2=A cos(2πft)−a sin(2π2ft). This modulated wobble wave form S2 is the wave form to be modulated so that, when seen in the direction of time, the rise (which is the outer side direction of the disk) is steep compared to the fundamental wobble wave form S0, and the decline (which is the inner side direction of the disk) is gradual compared to the fundamental wobble wave form S0. In any one of modulated wobble wave forms S1 and S2, a zero crossing point becomes the same phase as the fundamental wobble wave form, and it is formed to be capable of easily extracting the clock in a reproduction side.

FIGS. 5A and 6A illustrate that each of wave forms, S3 and S4 is to be formed by multiplying the sin signal (sin(2π2ft)) that has the frequency 2 times as great as the fundamental wave which is used in processing of the reproduction side to a reproduced modulated wobble signal. That is, the wave form S3 is obtained by a reproduced modulated wobble wave form S1×sin(2π2ft), and the wave form S4 is obtained by a reproduced modulated wobble wave form S2×sin(2π2ft).

Figure 5B:
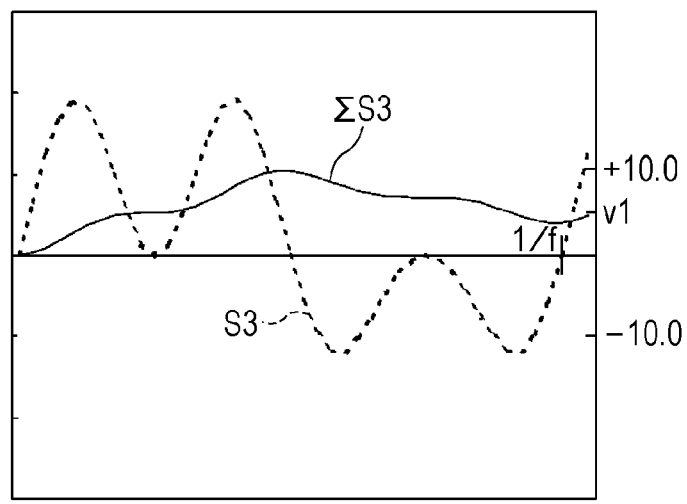
Figure 6B:
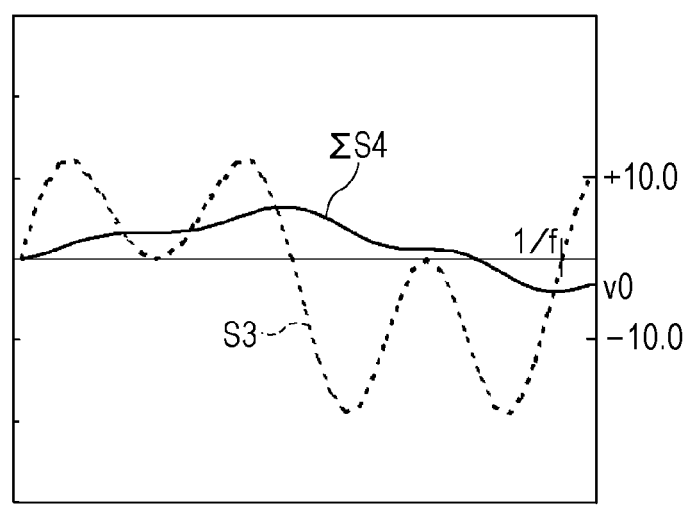

In the reproduction side, as shown respectively in FIGS. 5B and 6B, integrated values ΣS3 and ΣS4 are obtained by integrating (adding up) each of the wave forms S3 and S4 over one wobble cycle. The integrated value ΣS3 becomes a positive value v1 in a point of time when one wobble cycle has elapsed. On the other hand, the integrated value ΣS4 becomes a negative value v0 in a point of time when one wobble cycle has elapsed. The integrated value is dealt with, for example, v1=+1, v0=−1.

Since 1 bit of the data is expressed by 56 wobbles, if all is +1, +56 are obtained as a result of integrating 56 wobbles, and if all is −1, −56 are obtained as a result of integrating 56 wobbles. The same code sequence as used in a time of recording has been multiplied to a regenerated chip series obtained as the integrated value of each wobble, and 1 bit ("1"/"0") of the data is determined based on the result of integrating 56 wobbles regarding such a result.

2. Embodiment

Main Difference with BD Format

In an embodiment of the present disclosure, a main difference with the above described BD format is as the follows:

The BD format is to rotate the disc at a constant linear velocity (hereinafter, referred to as CLV), and on the contrary, the present disclosure is to rotate the disc at a constant angular velocity (hereinafter, referred to as CAV). A plurality of zones are formed by dividing the radial direction of the disc, and in the zones, a zone CAV control which performs a CAV control may be adopted. In a wobble track of a spiral shape by the CAV or the zone CAV, it is possible that the phase of the fundamental wave of the wobble is mutually synchronized in the radial direction of the disk.

The BD format is a groove recording method of recording in the groove, and on the contrary, the present disclosure performs in the both sides of the groove and the land to increase the recording capacity. Further, as described above, what corresponds to a ditch is referred to as the groove, and a track formed by the groove is referred to as a groove track. The groove is defined as a position irradiated by a laser beam in a time of manufacturing an optical disc, an area which is interposed between grooves is referred to as a land, and the track formed by the land is referred to as a land track.

A first wobble position in which a wobble fundamental wave form is modulated by groove address information, and a second wobble position of the wobble fundamental wave form are sequentially formed in the groove track. In the groove of the both sides which interpose the land, the positions of the first wobble position and the second wobble position are set to be different from each other. The address information of the land is prescribed by two items of groove address information respectively obtained from the grooves of the both sides.

Arrangement of Address Information (Recording)

A description will be given regarding an arrangement of the address information according to an embodiment of the present disclosure referring to FIG. 7. FIG. 7 is schematically illustrating a groove track G and a land track L which are continued in the radial direction of the disk. As an example, an upper position of the figure is an inner side (center side), and a lower side is an outer circumferential side of the disc. The groove is formed in a spiral shape facing from the inner side of the disk to an outer side, and track address is formed to be increased facing toward the outer side. Further, a beam spot is regarded to scan from the left to the right (recording/reproducing beam spot) when seen from the front side of the figure.

Further, as shown in FIG. 7, the track which corresponds to a predetermined data unit, for example, 1 RUB is divided to two parts, any one of a first half and a latter half is the first wobble position (oblique lined area) in which the wobble fundamental wave form has been modulated by the groove address information, and the other one of the first half and the latter half is the second wobble position of the wobble fundamental wave form. In the grooves of the both sides which interpose each land track L in between, the first wobble position and the second wobble position are set to be different from each other in position. That is, the first wobble position of the groove address information is arranged in a checkered pattern.

Each of groove address information includes the data structure of the ADIP word similar to the BD format. The ADIP word is configured by 83 ADIP units, and each ADIP unit is configured by 56 wobbles similarly to the BD format. And the address information and error correction code, and the like are contained in each ADIP word. Each ADIP word contains (56×83) wobbles.

Further, the ADIP word may be multiple recorded. In addition, in the BD format, the data of the address information and the like is recorded in the both sides of the MSK and the STW. It may be recorded in this manner, but in order to improve a clock reproduction by increasing a recording quantity of the wobble fundamental wave form (monotone) as much as possible, the MSK is used for synchronizing the head portion of the unit, but is set not to be used in recording the data. Recording of the data is performed by the STW only.

FIG. 8A illustrates the address information which is recorded in each track. An oblique lined area is such area that the address of the groove track is not recorded. Track numbers, Trkn, Trk(n+2), Trk(n+4) . . . are imposed to the groove track G. It is defined that (n=0, 1, 2, . . . ). Tracks, Trk(n+1), Trk(n+3) . . . which are interposed by the groove tracks in the both sides are the land track L. As the first wobble position of the groove track G, address information, An, An+2, A+4 . . . (hereinafter, appropriately referred to as groove address) are recorded.

In this manner, since the address information is recorded, if each track is scanned, the address information is reproduced as shown in FIG. 8B. For example, when a groove track Trkn is scanned, the address information An is intermittently reproduced. Next, when a land track Trk(n+1) is scanned, the address information An and An+2 which are recorded as the groove of an one side are sequentially reproduced. In a case of the land track, a pair of the address information is obtained by a predetermined recording unit, for example, 1 RUB.

The address information of the land track is prescribed by the pair of the address information. For example as shown in the above example, when the pair of the address information is An and An+2, the address information of the land track is set to a value of a middle of the both sides (expressed as An+1). In this manner, it is possible to prescribe the address of the land track.

In an embodiment of the present disclosure, it is possible to record the groove address and a land address in the same manner as the BD format by the ADIP word. For example, it is possible to record the groove address as the wobble track which has been modulated in the STW method. Further, since it is possible to record the land address by only the wobble of the groove track, it is possible to record the address without significantly changing a mastering device of the BD format currently existing.

Disk Reproducing Apparatus

Figure 9:
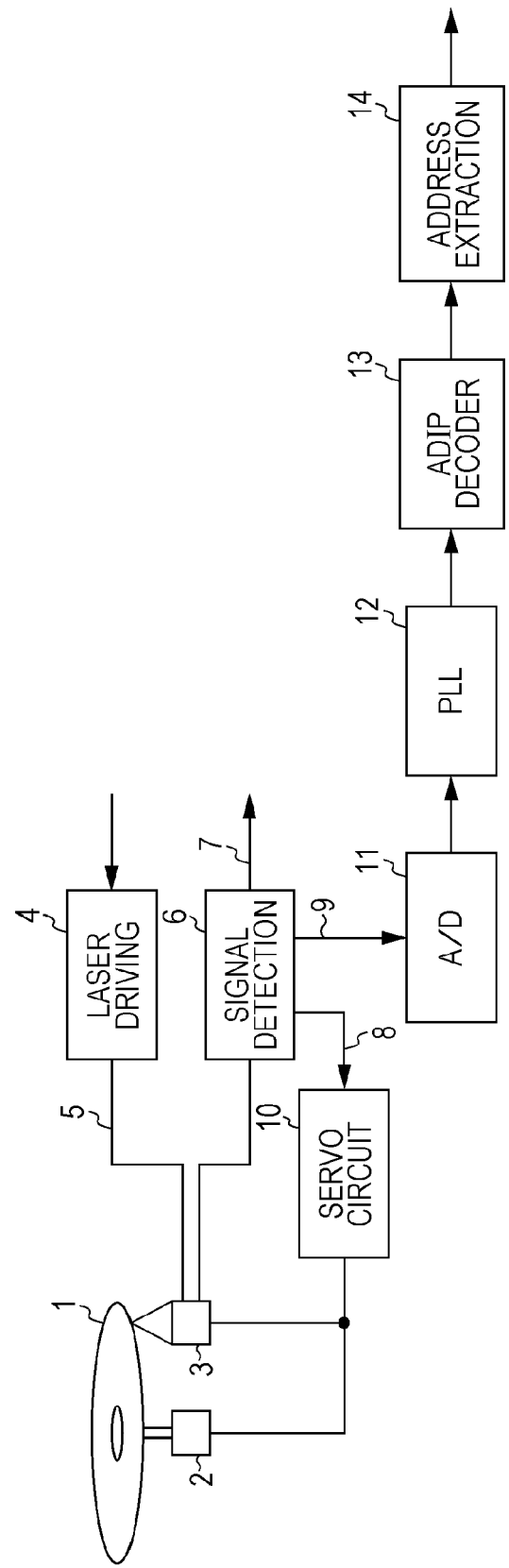
FIG. 9 is a block diagram illustrating a reproducing apparatus of an embodiment of the present disclosure.

In the disc reproducing apparatus according to an embodiment of the present disclosure, a reproduction of the address will be mainly described. As shown in FIG. 9, the data is recorded to an optical disc 1 in which the groove address and the land address are recorded, and the data is reproduced from the optical disc 1.

The optical disc 1 is rotated at the constant angular velocity by a spindle motor 2. That is, the optical disc 1 is rotated in a CAV system. A zone CAV system may be used. A driving signal is supplied from a laser driving unit 4 to an optical head 3, and the optical disc 1 is irradiated from the optical head 3 by a laser beam whose strength has been modulated corresponding to recording data 5, and the data is recorded to a predetermined position of the optical disc 1 which has been prescribed based on a reproduced address information.

The optical disc 1 is irradiated by the reading laser beam from the optical head 3, a reflected light from the optical disc 1 is detected by a photodetector in the optical head 3, and the reproduced signal is detected by a signal detection unit 6. A reproduced signal 7, a servo error signal 8 such as a focus error signal, a tracking error signal, and a wobble signal 9 are extracted from the signal detection unit 6. The wobble signal 9 is, for example, an output signal of a detector in which a photo detection element is divided into two parts in a track direction. For example, a summation signal of two detectors is extracted as the wobble signal 9. The wobble signal 9 becomes what corresponds to a wobble wave form. In a case where wobbles of the both sides of the track are in the same phase, a level of the wobble signal 9 is maximized, and in a case where the wobbles of the both sides are in a reverse phase from each other, the level of the wobble signal 9 is minimized.

The error signal 8 is supplied to a servo circuit 10. A rotation of a spindle motor 2 is controlled at the constant angular velocity, and a focus and a tracking of the optical head 3 are controlled by the servo circuit 10.

The wobble signal 9 detected by the signal detection unit 6 is supplied to a A/D converter 11, and converted to a digital signal by the A/D converter 11. An output signal of the A/D converter 11 is supplied to a digital PLL (Phase Locked Loop) 12. The clock synchronized with the readout signal from the PLL 12 is output. The clock becomes a basis of timing for processing in a time of reproduction.

A digital output of the wobble signal is supplied to an ADIP decoder 13. The ADIP decoder 13 decodes address data and the like recorded as the STW in every ADIP word, and performs an error correction. The address data decoded by the ADIP decoder 13 is supplied to an address extraction unit 14. In a case of scanning the groove track, the groove address information is extracted as an output. In a case of scanning the land address, the land address prescribed by two land addresses reproduced sequentially is output from the address extraction unit 14. In the address extraction unit 14, an address extraction is performed depending on whether the track which scans currently is the groove track or the land track.

Further, in the ADIP decoder 13, the STW is decoded. As described above, the sin signal ($\sin(2\pi 2ft)$) that has the frequency 2 times as great as the fundamental wave is multiplied to a reproduced wobble signal (STW). That is, S3=S1×sin($2\pi 2ft$) or S4=S2×sin($2\pi 2ft$) is obtained. A signal of a calculation result is supplied to an integrator, and integration is performed in 1 wobble cycle in the integrator. The integration result in 1 wobble cycle is +1 or −1 corresponding to the data. Further, while the address information is not recorded, in a position of the wobble fundamental wave form, the integration result in 1 wobble cycle becomes 0 approximately.

An embodiment of the present disclosure intermittently records the address information to the groove track, but there is no problem where the wobble is interrupted. Thus, it is possible to well reproduce the clock synchronized with a disc rotation in a time of recording/reproducing.

3. Modified Example

In the above, a detailed description has been given regarding an embodiment of the present disclosure. However, no particular limitation is not imposed on each of the aforementioned embodiments, and it is possible to adopt various modification based on a technological idea of the present disclosure. For example, a configuration, method, process, form, material, numerical value, and the like enumerated in the above mentioned embodiment are only examples, and the configuration, the method, the process, the form, the material, the numerical value, and the like different therefrom may be appropriately used depending on the occasions. For example, a part of the address information intermittently recorded to the groove track may be allotted to the groove address, and the other part may be allotted to the land address.

Further, in the present disclosure, it is possible to adopt the following configuration.

(1) An optical information recording medium of a CAV or a zone CAV, wherein a groove wobbling continuously is formed in advance so as to record information to the groove and a land abutting the groove, wherein the groove alternately has a first wobble position in which a wobble fundamental wave form has been modulated by groove address information, and a second wobble position of the wobble fundamental wave form, and wherein in the grooves of the both sides by which the land is interposed, the first wobble position and the second wobble position are different from each other in position.

(2) The optical information recording medium according to (1) wherein address information of the land is prescribed according to two items of groove address information respectively obtained from the grooves of both sides.

(3) The optical information recording medium according to any one of (1) and (2), wherein the first wobble position and the second wobble position are formed by a predetermined unit of recording data.

(4) An optical information recording medium reproducing apparatus, wherein a groove wobbling continuously is formed in advance so as to record information to the groove and a land abutting the groove, wherein the groove alternately has a first wobble position in which a wobble fundamental wave form has been modulated by groove address information, and a second wobble position of the wobble fundamental wave form, and wherein in the grooves of the both sides by which the land is interposed, the first wobble position and the second wobble position are different from each other in position.

(5) The optical information recording medium reproducing apparatus according to (4), wherein the address information of the land is prescribed according to two items of groove address information sequentially reproduced from the grooves of the both sides.

(6) The optical information recording medium reproducing apparatus according to any one of (4) and (5), wherein the first wobble position and the second wobble position are formed by a predetermined unit of recording data.

(7) The optical information recording medium reproducing apparatus according to any one of (4), (5) and (6), wherein the first wobble position is a wave form that is obtained by calculating a harmonic wave signal of a different polarity corresponding to data regarding the fundamental wave form.

(8) The optical information recording medium reproducing apparatus according to any one of (4), (5), (6) and (7), further including: a detector which is divided into at least two parts toward a track direction of the optical information recording medium, and detects an optical feedback from the optical information recording medium to reproduce the first wobble position corresponding to an output of a light sensing unit of the both sides toward the track direction of the detector.

The present disclosure contains subject matter related to that disclosed in Japanese Priority Patent Application JP 2012-123215 filed in the Japan Patent Office on May 30, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An optical information recording medium of a CAV or a zone CAV,
    wherein a groove wobbling continuously is formed in advance so as to record information to the groove and a land abutting the groove,
    wherein the groove alternately has a first wobble position in which a wobble fundamental wave form has been modulated by groove address information, and a second wobble position of the wobble fundamental wave form,
    wherein in grooves of the both sides by which the land is interposed, the first wobble position and the second wobble position are different from each other in position, and
    wherein address information of the land is prescribed according to two items of groove address information respectively obtained from the grooves of both sides.

2. An optical information recording medium of a CAV or a zone CAV,
    wherein a groove wobbling continuously is formed in advance so as to record information to the groove and a land abutting the groove,
    wherein the groove alternately has a first wobble position in which a wobble fundamental wave form has been modulated by groove address information, and a second wobble position of the wobble fundamental wave form,
    wherein in grooves of the both sides by which the land is interposed, the first wobble position and the second wobble position are different from each other in position, and
    wherein the first wobble position and the second wobble position are formed by a predetermined unit of recording data.

3. An optical information recording medium reproducing apparatus,
    wherein the apparatus optically reproduces an optical information recording medium of a CAV or a zone CAV in which a groove wobbling continuously is formed in advance so as to record information to the groove and a land abutting the groove,
    wherein the groove alternately has a first wobble position in which a wobble fundamental wave form has been modulated by groove address information, and a second wobble position of the wobble fundamental wave form,
    wherein in grooves of the both sides by which the land is interposed, the first wobble position and the second wobble position are different from each other in position, and
    wherein the address information of the land is prescribed according to two items of groove address information sequentially reproduced from the grooves of the both sides.

4. The optical information recording medium reproducing apparatus according to claim 3,
    wherein the first wobble position and the second wobble position are formed by a predetermined unit of recording data.

5. The optical information recording medium reproducing apparatus according to claim 3,
    wherein the first wobble position is a wave form that is obtained by calculating a harmonic wave signal of a different polarity corresponding to data regarding a fundamental wave form.

6. The optical information recording medium reproducing apparatus according to claim 3 further comprising:
    a detector which is divided into at least two parts toward a track direction of the optical information recording medium, and detects an optical feedback from the optical information recording medium to reproduce the first wobble position corresponding to an output of a light sensing unit of the both sides toward the track direction of the detector.

* * * * *